United States Patent Office 3,846,148
Patented Nov. 5, 1974

3,846,148
NOVEL COMPOSITE PIGMENTS
John S. Nordyke, Pittsburgh, and William C. Spangenberg, Mount Lebanon, Pa., assignors to Hammond Lead Products, Inc., Hammond, Ind.
No Drawing. Continuation-in-part of abandoned application Ser. No. 182,241, Sept. 20, 1971. This application Aug. 31, 1972, Ser. No. 285,323
Int. Cl. C09c 1/28
U.S. Cl. 106—308 B                            23 Claims

ABSTRACT OF THE DISCLOSURE

Novel composite pigments which exhibit excellent corrosion inhibition and tannin absorptive properties, comprise an inert silicate mineral base pigment having adhered to the particles thereof and intimate association therewith at least one additive compound which may be a basic or a hydrated metal phosphate, phosphite, borate or chromate. Pigment-forming additive compounds forming composite pigments which are non-toxic include those in which the metal is calcium or magnesium. Other metals include strontium, barium, lead and zinc. The base pigment may be wollastonite, talc, mica, nepheline syenite or feldspar. The additive compounds show valuable pigment properties when formed, preferably, in the presence of and on the surface of the basic pigment substrate particles acting as a substrate, in water suspension with prolonged attrition. The composite pigments may, however, be prepared by mixing the previously prepared additive compounds with the base pigment in water suspension and with prolonged attrition.

CROSS-REFERENCE TO RELATED APPLICATION

This application is a continuation-in-part of application Ser. No. 182,241 now abandoned, filed Sept. 20, 1971.

BACKGROUND OF THE INVENTION

The present invention relates to novel composite pigments comprising an inert silicate mineral base pigment substrate having adhered to the particles thereof and intimate association therewith at least one additive compound which may be a basic or hydrated metal phosphate, phosphite, borate or chromate. In accordance with a particular aspect of the invention, non-toxic composite pigments of the character described are provided by utilizing as the metal of the additive compound a non-toxic metal.

Legislation which may prohibit the use of lead-based paints in housing construction and maintenance creates an urgent need for new pigments which can perform the functions formerly filled by lead pigments. It is not sufficient simply to replace lead. Other toxic substances must also be eliminated if full protection against hazardous materials in paints is to be achieved.

Lead pigments have been used in paints for centuries for the protection and decoration of wood and metals. Red lead is outstanding as a pigment for use in corrosion inhibitive paints for steel. White lead has long been used in house paints, although this service has been confined to exterior use since the late 1930's. Newer lead pigments have rendered valuable service in the recently developed water-thinnable exterior house paints, where their power to absorb tannin helps to avoid bleed-through and unsightly discoloration of the surface.

Passage of the "Lead Paint Poisoning Prevention Act" (Public Law 91–965 on Jan. 13, 1971), may have the effect of elimination of lead based paints from all housing construction and maintenance. Such a course would eliminate lead as a potential health hazard to children, at least as far as new painting is concerned. It will do nothing to protect them from other toxic metal compounds which are commonly used in paints.

All soluble heavy metal compounds are poisonous in some degree, some more so than lead. It is a well known fact that for a pigment to be active and useful in protection against corrosion, or in fixing tannin, it must itself be slightly soluble in water, and capable of ionization. Thus, it is apparent that all active heavy metal pigments are potentially hazardous substances. Barium sulphate is quite insoluble. Its use in paint is limited to that of an inert filler. Its insolubility makes it safe to use internally for X-ray contrast. Barium carbonate and barium metaborate, on the other hand, are slightly soluble and are toxic materials. In fact, barium carbonate has been used extensively as a rodenticide. Soluble compounds of antimony, arsenic, barium, cadmium, chromium, cobalt, copper, lead manganese, mercury, molybdenum, nickel, selenium, silver, tellurium and others are toxic if ingested. Certainly it is of limited value to forbid the use of lead pigments and to leave other potentially poisonous pigments in uncontrolled use.

Since the Congress may well have banned the future use of lead pigments in paints for all housing construction and maintenance, effective replacements must be found. A real and urgent need exists for new pigments which can perform the functions so capably filled by lead pigments, but which are not themselves toxic. We have discovered, studied, and developed a group of composite pigments which meet these requirements in varying degrees. Some are very effective in absorbing tannin. Others provide excellent corrosion protection properties. Some are effective in both areas of use. Some impart to paint films a totally unexpected and very high degree of toughness and adhesion to metal equalling or exceeding the best which we have seen before. All are free from substances which could cause poisoning under any conditions of use, or accidental ingestion, known to us.

GENERAL DESCRIPTION OF THE INVENTION

There are several mineral compounds which are available in finely powdered form which are used in paints as inert extenders or fillers. They have no merit either as corrosion inhibitive or as tannin absorptive pigments. Among these are such materials as talc, mica, nepheline syenite, wollastonite, feldspars of various compositions, and silica.

In accordance with the present invention, we have found that these inert materials can be made to function as a base pigment by forming a composite with a suitable additive compound formed in the presence of the base pigment in aqueous suspension. The composite pigment may, however, be prepared by mixing the previously prepared additive compounds with the base pigment in aqueous suspension, and then subjecting the resulting slurry to prolonged attrition. The novel composite pigment of our invention comprises particles of an inert pigment base material having adhered to the surfaces thereof and in intimate association therewith at least one additive pigment.

The composite pigments of the invention are advantageously prepared by forming in an aqueous medium a suspension of particles of the inert pigment base, then introducing into the suspension of the base a suitable additive forming compound, then adding a reagent capable of reacting to form the additive compound in the presence of the base material, and then subjecting the suspension of the pigment base and the formed additive compound to attrition for a period of time sufficient to produce an intimate association of the additive compound with the particles of the pigment base. During this attrition the viscosity of the mixture increases. The additive compound may be formed either in crystalline or in amorphous condition.

We do not have any particular explanation of why the additive compound thus formed in the presence of the inert base pigment exhibits such strong adhesion thereto, but we have found that once the composite has been formed, the base material and the adhering additive compound cannot be separated by physical means alone. When employed as a pigmentary ingredient of paints, such as oleoresinous paints, the composite pigments of the invention provide greatly improved hardness and durability of the pigment coating.

In these composite pigments, the additive compounds are preferably formed in the presence of the inert base pigment with prolonged attrition in water suspension. They may also be formed separately from the base pigments and later subjected together with the base pigment to prolonged attrition in water suspension, in which case, the additive pigment forms substantially in the crystalline state but converts substantially to the amorphous state. It is believed that the amorphous additive compound or compounds effectively coat the base pigment particles. The composite comprising wollastonite, talc or mica with amorphous dicalcium phosphate monohydrate and/or calcium borate hydrates produces a truly synergistic effect in which the composite is capable in appropriate paint formulations of absorption of tannin, protection of metals against corrosion and of generating a high degree of toughness and adhesion of paint films to metal to a degree far beyond the powers of the individual constituents.

Those materials which we have found most effective as inert base pigments are wollastonite, talc and mica, but nepheline syenite and feldspar may also be employed.

Wollastonite is a naturally occurring mineral with the composition $CaO.SiO_2$. It is prepared in the form of finely ground acicular particles. We have found it to be the most effective base pigment in all respects in our composite pigments, giving excellent results with our additive compounds in absorption of tannin, protection against corrosion, and in imparting toughness and adhesion to oleoresinous films. In addition, all of the formulations based on wollastonite composites have been totally free from blistering in our salt spray testing.

Composites based on the talcs ($3MgO.4SiO_2.H_2O$) and on mica or muscovite ($K_2O.3\ Al_2O_3.6SiO_2.2H_2O$) are effective absorbers of tannin, being comparable in this respect to wollastonite-based composites. Some oleoresinous paint films based on composite pigments in which the talcs or mica ar used show an objectionable degree of blistering during our salt spray testing, and are otherwise slightly lacking in film integrity.

Feldspars are naturally occurring potassium, sodium and calcium aluminum silicates of igneous origin. They are usually mixtures of microcline ($K_2O.Al_2O_3.6SiO_2$), albite ($Na_2O.Al_2O_3.6SiO_2$) and anorthite ($CaO.Al_2O_3.2SiO_2$).

We have not found that the ratio of one mineral to the other is critical. Nepheline syenite is a mineral of igneous origin containing feldspar and nephelite, a silicate of sodium and aluminum. Both these silicate minerals may be utilized as base pigment materials, in accordance with the invention.

It may be seen that composites based on wollastonite are the most effective and the most versatile of all those which we have evaluated.

The average particle size range of the base pigment material will lie within the following limits which are not critical however:

|  | Microns |
|---|---|
| Talc and mica | 2 to 20 |
| Wollastonite | 1 to 20 |
| Feldspar and nepheline syenite | 1 to 20 |

The additive compounds which we have found most effective, while at the same time being non-toxic, are calcium phosphate (a principal constituent of bone structure) and calcium borate. Both of these materials have been known to have some corrosion inhibitive power, but they have not found use in paints because of their limited effectiveness. We have discovered that when either is formed in the presence of a suitable inert base pigment by our process, the additive compound and the base pigment act together jointly as a synergistic pair to achieve effects of which each individually, is incapable. The composite pigment resulting from this association possesses properties which are superior in all respects to the properties, or degree of effectiveness of the individual substances or of a simple mixture thereof. While we do not yet fully understand the mechanism or surface chemistry of these composite pigments, it seems clear that a truly synergistic effect exists.

Advantageously these compounds as formed in the presence of the base pigment material are in hydrated state. As mentioned previously, they might be in crystalline or amorphous state, but more often they are amorphous.

The additive compounds may also be employed as mixtures. Calcium phosphates which may be employed in accordance with the invention include monocalcium, dicalcium, and tricalcium phosphate, of which the basic calcium phosphates, such as dicalcium phosphate are preferred.

Calcium borates which can be used include calcium metaborate $CaO.B_2O_3$, or borates with predetermined ratios of calcium to $B_2O_3$, including even calcium tetraborate, but basic borates are preferred.

The calcium phosphate composition which we prefer to use in our composite pigment is dicalcium phosphate monohydrate, $2CaO.P_2O_5.H_2O$. It is essential that the pH of the composite pigment be greater than 7. When dicalcium phosphate is formed in the presence of our preferred base pigments by our process, the pH of the resulting composites ranges from 8.4 to 12.5.

The composite pigments formed when calcium borate is used also must have pH greater than 7 in order to be useful. Consequently, we prefer to use CaO in a molar ratio with $B_2O_3$ greater than 1 to 1.

Calcium phosphite may also be employed as an additive pigment material in accordance with the present invention.

We have prepared our basic calcium phosphate alone from our chosen reagents, all conditions being the same as in normal practice except that no base pigment was present. We have also prepared our preferred calcium borate composition in the same manner. We have then mixed these compounds in a paint mill with our base pigments individually and have evaluated the resulting paints. The calcium phosphate mixture with wollastonite gave poor results in all cases, in no way comparable to the composite pigment formed by our process. The difference was not so striking in the case of the calcium borate-wollastonite mixture. In this instance, the film integrity and adhesion were good, the corrosion inhibition and the tannin absorption were fair. In no case were they equivalent to the composite pigment formed in our preferred process.

Of the greatest significance is the fact that the basic calcium phosphate compositions which we have used are amorphous when formed for example in the presence of talc, mica or wollastonite by our process, whereas they are crystallnie when formed alone. We have also found that the basic calcium borate, which we prefer to use as an ingredient of our composite pigments, is a mixture of crystalline and amorphous material when formed alone. When formed in the presence of talc, mica or wollastonite, it appears to form in a partly crystalline but substantially amorphous state.

Whenever we have formed calcium phosphate by our process, we have found that it forms in an amorphous state in the presence of talc, wollastonite and mica. When formed alone, or in the presence of such inert materials as nepheline syenite, the feldspars, and silica, it is crystalline in form. When formed separately, then water-ground with wollastonite, dicalcium phosphate monohydrate converts substantially from the crystalline to the amorphous state.

We have found further that the hydrated amorphous forms of the phosphates, phosphites, borates, borophosphates, and borophosphites of metals such as magnesium, strontium, barium, lead and zinc, as well as calcium phosphite, strontium chromate, and barium chromate, and mixtures thereof, exhibit valuable pigment properties when formed in the presence of and on the surface of the aforementioned silicate mineral base pigment particles. These additive pigment materials or compounds may be employed individually or as co-formed mixtures.

We attach great importance to the amorphous phase of our additive materials. We believe that the amorphous form is capable of forming a true coating on the surface of the particles of the base pigment, whereas the crystalline form would be incapable of forming such a coating. This may well explain the peculiar and surprisingly strong power of adhesion to metals imparted to oleoresinous coatings by our composite pigments. It may also play a substantial part in the excellent tannin absorption and corrosion inhibition properties imparted by our composite pigments, far beyond the capability of the constituents of the composites individually. We are not yet prepared to say with total certainty that the amorphous state is critical to the effectiveness of our additive materials, but the likelihood of that being true is strong. In any event, wollastonite, talc and mica appear to be capable of assuring the presence of amorphous calcium borate or calcium phosphate when they are formed and/or water-ground in their presence. It appears that these materials, ordinarily considered to be inert, act as synergens with the additive compounds to assure the most effective physical state of the composite, while other inert materials we have tested do not.

Combined X-ray diffraction and thermographic analysis identifies our dicalcium phosphate as the monohydrate, $2CaO.P_2O_5.H_2O$. The basic calcium borate of our composite pigments is a mixture of calcium borate dihydrate, calcium borate pentahydrate and calcium borate hexahydrate, the monohydrate being the principal compound, with CaO being present in a ratio with $B_2O_3$ greater than 1 to 1.

The patent literature contains numerous references to calcium phosphate and to calcium borate compounds and method of manufacture. Cohn, et al., in U.S. Pat. No. 3,576,657 teaches the reaction upon wollastonite with phosphoric acid to produce a composition consisting of calcium phosphate, amorphous silica and residual unreacted wollastonite. The product is acid in nature, having a pH value reported as 5.0, but with extended boiling, reaching a maximum of 6.8. The product is described as containing abrasive particles. Although probably useful for ceramic or paper applications, its acidity and abrasiveness would tend to limit its usefulness as a paint pigment. The phosphate compound produced by Cohn is fundamentally different from ours, which is dicalcium phosphate monohydrate with pH greater than 7. In our process there is no reaction upon the wollastonite by the other reagents, which combine with each other in forming our composite pigment. Furthermore, our products with pH ranging between 8.4 and 12.5 are basic in nature and show no free silica in their composition. Not only is the process employed by Cohn fundamentally different from ours, but his product is totally different in nature and is not intended for the purposes for which our composite pigments are intended.

In Pat. No. 3,380,836, Robinson teaches the use of calcium metaborate as a pigment to be used in paints for corrosion inhibitive purposes. Robinson describes the addition of calcium metaborate as a substitute constituent in a number of standard paint formulations and cites the results of exposure to 5% salt spray, with apparent benefit in regard to corrosion inhibition. No reference is made to tannin absorption. We have found that the synergistic effect of our composite pigments is obtained with calcium metaborate and our selected base pigments. By this means, we have obtained results superior to those where simple mixtures are used. We believe that this is due to the amorphous calcium metaborate of our composite pigment as distinguished from the crystalline calcium metaborate of Robinson. We have also found that the effectiveness of the composite pigment for all purposes is further enhanced if the pH is greater than 10. For this reason, we prefer to use a basic calcium borate having a ratio of CaO to $B_2O_3$ greater than 1. It is clearly evident that our invention differs from that of Robinson not only physically and chemically, but also in degree of effectiveness.

The proportion of additive compound to base pigment in the composite pigments of the invention is not critical, and lies generally between about 8% and about 65% by weight. The preferred proportion is one in which the composite pigment contains approximately 20% by weight of the additive compound and about 80% by weight of the base pigment silicate mineral. These values represent the compound or compounds calculated on the anhydrous basis. Since the hydrated form of the various compounds contain differing quantities of combined water, the actual percentage of hydrated additive compound will be greater than the value of 20% given above. The minimum and maximum useful content of additive compound will vary somewhat with the various compounds used. We find, however, that there is little value in a composite pigment for any of our projected uses where the percentage of additive compound is less than 4% of the total. This limit value applies to hydrated lead borate. With most other additive compounds, the effective working minimum percentage is about 8%. On the other hand, useful properties fall off rapidly when the percentage of the additive compound approaches 65%.

While good results have been achieved with composites in which the calcium phosphate or calcium borate vary in content from 8% to 65%, by weight, we prefer to use approximately 15% to 30% by weight of one or the other additive compound or of a mixture of the two additive compounds and about 70% to 85% by weight of the base pigment. The factors of film toughness and adhesion appear to be best in this range.

Our invention makes it possible to formulate paints for many purposes without the use of toxic substances, with the exception, in some cases, of volatile thinners which evaporate, certain paint driers which are used in small quantities, and some tinting pigments. Thus, it can be seen that the use of our novel pigments makes it possible to add greatly to the safety of industrial workers who manufacture pigments and paints, and also removes a hazard from painters who apply coatings, especially by spraying. Perhaps of even greater importance is the protection afforded to the public, especially to small children, who have been poisoned in the past by exposure to paints containing toxic substances.

We have used prepared tricalcium phosphate as an additive material with some degree of success. It does not always function as well, however, as dicalcium phosphate formed in the presence of the base pigment and with prolonged water-grinding. We have used the mineral Colemanite ($2CaO.3B_2O_3.H_2O$) as a means of introducing calcium borate into a composite pigment. The results were not as satisfactory as the preferred compounds of the invention.

A method of manufacture of our composite pigments involves the formation of the additive compound in a mixing vessel equipped with agitating means, in water slurry in the presence of the base pigment followed by extended attritional action in a rotating pebble mill.

We have also prepared calcium phosphate and calcium borate, each alone in the pebble mill, and have then added our base pigments to the same mill and have continued the water-grinding overnight. The results obtained from paints made from the resulting composite pigment are good, but not as good as the results obtained when the additive compound is formed in the presence of the base pigment followed by prolonged water-grinding. For this reason, we prefer to form the additive pigment in the presence of the base pigment. X-ray diffraction studies combined with thermographic studies of our pigments show that there is no chemical reaction between our base pigments and the additive compounds. It is further shown that no substantial hydration of the base pigments occurs.

Table No. 1 below shows some important physical properties of some of the composite pigments we have made. These represent a limited number of examples and in no way limit the scope of our invention, since the compositions may vary widely from those cited as examples, both with regard to constituents and percentage.

In the manufacture of the composite pigment, the required quantity of each solid ingredient is introduced into a ball mill with a suitable quantity of water (e.g. 1500 to 2000 litres). In each case we prefer to introduce the constituents of our composite pigments into a reaction vessel equipped with a stirring mechanism in a relatively fixed order. First we introduce the required quantity of water. We then introduce the base pigment and the lime with continued stirring. This is followed by the required quantity of phosphoric acid and/or boric acid. As soon as the indications of reaction are completed, the slurry is pumped into a pebble mill. The pebble mill is put into operation for a period of up to 8 hours without the application of external heat. Because of the friction of the grinding system, the temperature of the slurry reaches a level of approximately 80° C. The resulting product is dried and pulverized.

We have found our composite pigments perform best when diluted least with other pigments. We have found that they give exceptionally good protection to metal against corrosion with outstanding film integrity, toughness and adhesion when made as nearly as possible into a single pigment paint with typical alkyd vehicles. Good protection after 470 hours of exposure to 5% salt spray with a single coat of 1.7–2.2 mils has been achieved repeatedly. As a result we have found it best to use no more hiding pigment, coloring pigment or mildewcide than necessary.

In preparing a paint or other protective coating composition utilizing the composite pigments of the invention, it has been found that at least 50% of the total pigment volume should comprise these composite pigments.

The composite pigments were tested in an air-drying primer similar in composition to recognized formulations containing standard anti-corrosion pigments and used on steel structures requiring long term protection. These primers were tested on cold rolled steel in 5% salt spray for 288 hours. The primers containing the composite pigments were found to be equivalent to the primers containing basic lead silico chromate or red lead, and nearly equivalent to the primer containing tribasic lead phosphosilicate.

There is no toxic pigment used in any of the examples of paints containing our composite pigments. This is an important fact when it is considered that neither the paint manufacturer nor the retailer has any means of determining or controlling the uses to which his paints may be put.

While it is not feasible to recite the details of the manufacture of each of the many composite pigments embodied in our invention, we cite the following examples which substantially cover the types and the board range of useful ratio of base pigment to additive compound. They also illustrate the essential requirements of the manufacturing process. In all cases, the water used is introduced at ambient temperature.

DESCRIPTION OF THE PREFERRED EMBODIMENTS

Since our composite pigments are almost totally lacking in hiding power, a moderate quantity of opacifying pigment, such as titanium dioxide or iron oxide is usually necessary. The low hiding power, on the other hand greatly minimizes the quantity of expensive coloring pigment needed to produce a desired shade of color.

The examples of paint formulations which we disclose below show two approaches to the use of our composite pigments. Example 6 shows complete substitution on a volume basis of a composite pigment for all but the opacifying pigment in a wood primer formulation. In Example 7 and 9, we have substituted our composite for all of the pigments originally specified. Examples 8 and 10 are partial substitutions, because of special effects required.

Following each example and the comments, we specify which composite pigment gives the best results in the formulation cited if any is substantially superior to the others.

The following examples illustrate the practice of the invention, but are not to be regarded as limiting:

EXAMPLE 1

The raw materials are mixed in a mixing vessel equipped with a stirring device, having a capacity of 5700 liters. First, 1891 liters of water are pumped into the mixing vessel. To this is added successively, with continuous stirring, 689 kg. of wollastonite (designated by the producer as grade P-4), 98 kg. of slaked lime containing 73.4% CaO and 154.2 kg. of phosphoric acid solution containing 75% $H_3PO_4$. The 98 kg. of lime is equivalent to 66.2 kg. of CaO, while the 154.2 kg. of phosphoric acid is equivalent to 83.8 kg. of $P_2O_5$. After visible signs of reaction cease, the slurry is pumped into a pebble mill equipped with a charge of dense alumina pebbles, occupying 55% of the apparent mill volume. The total mill volume capacity is 6435 liters. The mill is put into operation for 4 hours, after which the contents are drained and filtered. The filter cakes are dried and the product is pulverized in an impact mill. Certain of the properties of this and other composite pigments cited as examples are shown in Table No. 1.

EXAMPLE 2

This is a wollastonite-basic calcium borate composite. 769 kg. of wollastonite is stirred into 1502 liters of water in the mixing tank. Next, 115 kg. of slaked lime containing 73.4% CaO is added, followed by 98.5 kg. of anhydrous boric acid containing 98% $B_2O_3$. After ten minutes of stirring, the slurry is pumped to the pebble mill, described above. This mill is put into operation for a period of 4 hours, after which the slurry is drained, filtered and dried. The resulting product is pulverised in an impact mill.

EXAMPLE 3

1502 liters of water is placed in the mixing vessel. 781 kg. of wollastonite is added with continuous stirring. To this is added in succession, 90 kg. of slaked lime containing 73.4% CaO; 60.5 kg. of anhydrous boric acid containing 98% $B_2O_3$; and 59.5 kg. of phosphoric acid containing 75% $H_3PO_4$. After visible signs of reaction have ceased, the mixture is pumped into the pebble mill which is operated for 4 hours. The mill is then drained. The slurry is filtered and the product is dried and pulverized in an impact mill.

EXAMPLE 4

In this case, a very finely divided micaceous form of talc is used as the base pigment. To 1890 liters of water in the mixing vessel, 768.5 kg. of talc is added with continuous stirring. To this is added in order, 115 kg. of slaked lime containing 73.4 CaO and 98.5 kg. of anhydrous boric acid containing 98% $B_2O_3$. After visible signs of reaction have ceased, the slurry is pumped to the pebble mill which is put into operation for 4 hours.

The mill is drained and the product is filtered, dried and pulverized.

EXAMPLE 5

In this instance, micronized mica is used as the base pigment. To 1890 liters of water in the mixing vessel, 768.5 kg. of mica is added with continuous stirring. To this is added 115 kg. of slaked lime containing 73.4% CaO and 98.5 kg. of boric acid containing 98% $B_2O_3$. After visible signs of reaction have ceased, the mixture is pumped into the pebble mill, which is then put into operation for a period of 4 hours, after which the mill was drained. The slurry is then filtered and dried, and the product pulverized.

In all of the above cases, the only heat used was that generated by solution and reaction, and the friction of the system. The temperature of the slurry when milling was stopped was about 80° C.

Certain of the properties of the composite pigments produced in the above examples are shown in Table No. 1.

TABLE NO. 1

| Example | pH | Specific gravity | Bulking value, lbs./solid gallon | Apparent density, g./in.³ | Average diameter in microns |
|---|---|---|---|---|---|
| 1 | 8.5 | 2.9 | 24.16 | 3.6 | 6.0 |
| 2 | 9.5 | 2.6 | 21.66 | 4.2 | 6.0 |
| 3 | 9.2 | 2.5 | 20.83 | 3.8 | 6.0 |
| 4 | 8.8 | 2.3 | 19.16 | 1.1 | 2.0 |
| 5 | 9.0 | 2.4 | 19.99 | 1.4 | 5.0 |

EXAMPLE 6

| | Parts by weight |
|---|---|
| Titanium Dioxide | 160.0 |
| Composite Pigment [1] | 140.0 |
| Tamol 850 | 4.0 |
| Triton X102 | 0.8 |
| Nopco NXZ | 1.6 |
| Metasol 57 (100%) | 1.5 |
| Ethylene Glycol | 20.5 |
| Pine Oil | 2.4 |
| Cellosize Solution | 48.0 |
| Aerosol OT | 3.2 |
| AC 34 Resin | 410.0 |
| Water | 120.0 |

[1] Of the composites, that one formed using wollastonite as the base and dicalcium phosphate as the additive showed superior performance.

This paint formulation is useful as a primer composition for wood. It is an excellent primer for red wood and cedar and serves to correct or block the stain bleed-through associated with coatings applied to these and other high tannin content woods. Tests of this material when applied over wood or tannin-containing test surfaces resulted in reduction of tannin bleed and discoloration superior to similar primers containing basic silicate of white lead 45% barium metaborate, and basic silicate of white lead 85%, well known materials used for the same function.

EXAMPLE 7

| | Parts by weight |
|---|---|
| Composite Pigment [1] | 100.0 |
| Linseed, soya alkyd solution (50% non-volatile, 50% oil) | 214.4 |
| 25 gal. Tung Oil Ester Gum Varnish, 43% non-volatile | 36.0 |
| Mineral Spirits | 49.2 |
| Methyl Ethyl Ketoxime | 2.4 |
| Aluminum Stearate | 3.6 |

[1] See footnote 1 to table of Example 6.

This formulation is useful as a corrosion inhibitive air-drying primer composition for use on structural steels in outdoor applications, such as bridges, where maximum protection is needed. This material, when applied under the same test conditions to cold-rolled steel and subjected to 5% salt spray 510 hours, resulted in corrosion resistance superior to a similar formula containing basic lead silico chromate and equal to formulas containing red lead and tribasic lead phosphosilicate, both well known corrosion inhibitive pigments. This material displayed outstanding adhesion to the metal substrate, and was superior in this characteristic to similar formulas containing basic lead silico chromate, red lead, and tribasic lead phosphosilicate. The calcium borate, wollastonite composite are slightly the best in this formulation and are best for film toughness and adhesion.

EXAMPLE 8

| | Parts by weight |
|---|---|
| Composite Pigment [1] | 97.5 |
| Titanium Dioxide | 25.0 |
| Zinc Oxide | 10.0 |
| Chlorinated Rubber | 5.0 |
| Linseed, soya alkyd solution (50% non-volatile 50% oil) | 107.2 |
| Mineral Spirits 66/3, Rule 66 | 39.2 |
| Methyl Linoleate | 9.3 |
| Methyl Ethyl Ketoxime | 1.2 |
| Cobalt Naphthenate | .6 |
| Zirconium Octoate | 1.1 |
| Organomontmorillonite | 1.2 |

[1] Tests using the various composite pigments were equivalent to one another. Tests of standard compositions were made in which the composite pigments were substituted for the standard anti-corrosion pigment.

This material is useful as a fast air drying primer composition for metal for use under enamel topcoats. This is an excellent primer for on-site application of prefabricated metal parts or construction steels. Tests of this material, when applied over cold-rolled steel and subjected to 5% salt spray for 264 hours, resulted in corrosion resistance equivalent to a similar primer containing tribasic lead phosphosilicate, a well known white anti-corrosion pigment.

EXAMPLE 9

| | Parts by weight | | |
|---|---|---|---|
| Composite pigment [1] | None | None | 68.3 |
| Basic lead silico chromate | 150.0 | None | None |
| Tribasic lead phosphosilicate | None | 70.0 | None |
| Zinc oxide | | 3.8 | |
| Titanium oxide | | 12.5 | |
| Talc | | 12.5 | |
| Amorphous silica | | 12.5 | |
| Aluminum stearate | 0.9 | | 0.9 |
| Lecithin | 0.3 | 0.3 | 0.3 |
| Raw linseed oil | 46.2 | 45.0 | 46.2 |
| Soya alkyd (70% non-volatile, 60% oil) | 17.3 | 17.3 | 17.3 |
| Mineral spirits | 12.2 | 13.2 | 12.2 |
| Methyl ethyl ketoxime | .2 | .2 | .2 |
| Manganese naphthenate | .4 | .5 | .4 |
| Zirconium octoate | 1.5 | .9 | 1.5 |

[1] Tests using the various composite pigments were equivalent to one another.

These are air-drying coatings for use on structural steel which requires maximum protection from corrosion. Tests were conducted on these, where the formulas are similar, and the effect of the inhibitive pigmentation determined on a basis of substitution. After 288 hours a 5% salt spray test, the material containing the composite pigment was found to be equivalent to the material containing tribasic lead phosphosilicate, and superior to the material containing basic lead silico chromate.

EXAMPLE 10

| | Parts by weight | | | |
|---|---|---|---|---|
| Composite pigment [1] | | | | 54.0 |
| Basic lead silico chromate | 101.9 | | | |
| Tribasic lead phosphosilicate | | | 60.0 | |
| Red lead 97% | | 96.9 | | |
| Brown iron oxide | 6.2 | 23.8 | 12.5 | 12.5 |
| Zinc oxide | | | 3.8 | 3.8 |
| Talc | | 21.9 | 15.0 | |
| Amorphous silica | | | 10.0 | |
| Mica | | 6.3 | | |
| Lecithin | | | 0.3 | 0.3 |
| Aluminum stearate | 0.6 | 0.5 | 0.6 | 0.6 |
| Raw linseed oil | 20.6 | 21.3 | 20.6 | 20.6 |
| Linseed, soya alkyd (50% non-volatile, 50% oil) | 39.5 | 43.1 | 39.5 | 39.5 |
| Mineral spirits | 14.3 | 10.8 | 14.3 | 14.3 |
| Methyl ethyl ketoxime | 0.3 | 0.3 | 0.3 | 0.3 |
| Manganese naphthenate | 0.3 | 0.3 | 0.3 | 0.3 |
| Lead naphthenate | | | 0.6 | |
| Zirconium octoate | 0.9 | | 0.7 | 0.9 |
| Cobalt naphthenate | 0.2 | | | 0.2 |

[1] Within the group of primers made using composite pigments, the primer when made with wollastonite as the base and calcium borate as the additive compound gave slightly better salt spray performance and adhesion.

Having described the nature of our invention and having given examples of our new composite pigments along with information on the formulation and performance of some of the paints in which these new composite pigments were used, it is believed one versed in this art can readily understand our improvement in the art.

EXAMPLE 11

To 1700 liters of water in the mixing vessel, 700 kg. of wollastonite is added with continuous stirring. To this is added successively 120.5 kg. of slaked lime containing 73.4% of CaO and 430.4 kg. of phosphorous acid solution containing 30% by weight of $H_3PO_3$. As soon as the reaction between the lime and the phosphorous acid has subsided, the slurry is transferred to the pebble mill where it is subjected to milling and attrition for a period of from 2 to 4 hours. The mill is drained and the product is dewatered, dried and pulverized. This calcium phosphite-wollastonite composite is white with apparent density of 19.5 g. per 100 cc. and pH 10.2. It possesses good corrosion inhibitive properties in oleoresinous systems. The hydrated additive compound is about 24% of the total weight of the composite pigment.

EXAMPLE 12

To 1500 liters of water in the mixing vessel, we add 700 kg. of wollastonite, 170.3 kg. of barium carbonate, and 56.0 kg. of a 98% boric acid with constant stirring. After the reaction between the barium carbonate and the acid is complete and the gaseous evolution has subsided, the slurry is pumped to the pebble mill which is put into operation for a period of from 2 to 4 hours. The product is filtered, dried and pulverized. This basic barium borate composite pigment contains approximately 21.3% of amorphous hydrated active material in its final form. It is white with apparent density of 20.8 g. per 100 cc. with pH 9.2. It performs well as a corrosion inhibitive ingredient in oleoresinous and water systems and displays good general pigment properties.

EXAMPLE 13

This is a zinc phosphate-wollastonite composite pigment containing approximately 55.5% of the hydrated amorphous zinc phosphate on the wollastonite substrate particles.

In this instance, we introduce 1750 liters of water in the mixing vessel and add successively 450 kg. of wollastonite, 267.1 kg. zinc oxide, and 428.7 kg. of a 75% solution of phosphoric acid. After about 10 minutes of stirring, during which the initial reactions are essentially completed between the zinc oxide and the phosphoric acid, the slurry is pumped to the pebble mill which is put into operation for a period of from 2 to 4 hours.

The product is white. It has apparent density of 25.6 g. per 100 cc. and pH 7.2. This pigment shows excellent general pigment properties. It is a good corrosion inhibitive pigment. It also shows outstanding ability to absorb and block transmission of redwood tannins when used in water-based systems. It shows excellent ability to inhibit growth of mildew when used as a topcoat pigment and is quite opaque to ultraviolet light.

EXAMPLE 14

This composite pigment is a light yellow material with approximately 15.8% of amorphous strontium chromate formed on the surface of finely divided nepheline syenite particles. Apparent density is 20.8 g. per 100 cc. and pH 10.5. It shows excellent value as a corrosion inhibitive pigment.

To prepare this composite pigment, we introduce 1500 liters of water into the mixing vessel and add with stirring the following ingredients: 750 kg. of finely ground nepheline syenite; 106.7 kg. of strontium carbonate; and 65.7 kg. of chromium trioxide, either dry or in solution in 100 liters of water. After the reaction of the chromic acid upon the strontium carbonate is complete and gaseous evolution subsides, the slurry is pumped to the pebble mill which is put into operation for a period of from 2 to 4 hours. The product is dewatered, dried and pulverized.

EXAMPLE 15

This composite pigment containing approximately 6% of hydrated lead borate on wollastonite shows very good power to absorb cedar and redwood tannins even though the lead content is very low. This pigment can be used to prepare a useful water-based paint with less than 0.5% of Pb in the dried paint film. Apparent density is 18.6 g. per 100 cc. and pH is 9.1.

We manufacture this pigment by first introducing 1500 liters of water into the mixer, followed by 800 kg. of wollastonite. To this is added, with continuous stirring, 32.1 kg. of powdered litharge and 10.2 kg. of anhydrous boric acid containing 98% of $B_2O_3$. After about 10 minutes of stirring, the slurry is transferred to the pebble mill, which is put into operation for a period of from 2 to 4 hours. The product is dewatered, dried and pulverized.

EXAMPLE 16

This composite pigment illustrates the use both of a mixture of substrate materials and of additive compounds. It is a mixture of hydrated magnesium boro-phosphate and zinc boro-phosphate formed in the presence of and on the surface of a mixture of talc and finely ground feldspar. This pigment shows good general paint pigment properties, along with good tint retention, opacity to ultraviolet light, and lower oil and water absorption than many of the composite pigments. Apparent density is 17.7 g. per 100 cc. and pH is 8.4.

We prepare this pigment in the same general manner as the others. We introduce 1700 liters of water into the mixer along with 364 kg. of finely ground talc, and 386 kg. of feldspar. To this slurry is added, with continuous stirring, 48.3 kg. of magnesium oxide, 43.4 kg. of zinc oxide, 78.5 kg. of a 75% solution of phosphoric acid, and 25.3 kg. of anhydrous boric acid containing 98% $B_2O_3$. After the reactions are essentially completed, which should not require more than about 10 to 15 minutes, the slurry is transferred to the pebble mill. The mill is operated for a period of about 2 to 4 hours, during which the hydrated active material becomes essentially completely amorphous and adheres tightly to the substrate particles. The product is dewatered, dried and pulverized.

EXAMPLE 17

In this example, we cite the method of preparation of a white, hydrated composite pigment in which a mixture of barium phosphate and zinc phosphate are formed in the presence of and on the surface of a mixture of finely ground wollastonite and nepheline syenite. The active compounds in anhydrous form would constitute about 20% of the total pigment weight. In the hydrated state in which they exist, as formed by our process, they represent about 24% of the total. We use 1650 liters of water and add, with continuous stirring, 360 kg. each of wollastonite and nepheline syenite. To this we add 48.1 kg. of zinc oxide, 76 kg. of barium carbonate, and 127.5 kg. of a solution containing 75% of $H_2PO_4$. After about 10 or 15 minutes, the resulting slurry is transferred to the pebble mill, which is then put into operation for a period of from 2 to 4 hours. The product is then dewatered, dried and pulverized. This pigment shows excellent tannin blocking properties when used in water-based systems. It also is a very good corrosion inhibitive pigment; shows good mildew control properties and good opacity to ultraviolet light. The apparent density is 23.2 g. per 100 cc. and pH is 9.4.

EXAMPLE 18

This composite pigment is a mixture of the hydrated forms of calcium borophosphite and lead boro-phosphite formed in the presence of and on the surface of a mixture of finely ground wollastonite and nepheline syenite. The active compounds represent about 39.6% on the anhydrous basis and about 42.5% of the total in the hydrated amorphous form in which it exits. The pigment is faintly yellowish in color, with apparent density of 25.6 g. per 100 cc. and pH of 8.9.

In its preparation, we introduce 1600 liters of water, and 292 kg. each of finely ground wollastonite and nepheline syenite into the mixer, with continuous stirring. We then add 134 kg. of hydrated lime containing 73.4% CaO, 139.8 kg. of finely ground lead monoxide, 2 kg. of glacial acetic acid, 425 kg. of a solution containing 30% of $H_3PO_3$ and 43.5 kg. of anhydrous boric acid containing 98% of $B_2O_3$. These are added successively over a period of about 10 minutes. As soon as the gaseous evolution has subsided, the slurry is transferred to the pebble mill which is put into operation for a period of from 2 to 4 hours. The product is dewatered, dried and pulverized.

This pigment shows excellent corrosion inhibitive properties in oleoresinous and water-based systems. It has very good tannin blocking power. Apparent density is 25.6 g. per 100 cc. and pH is 9.6.

What is claimed is:

1. A composite pigment comprising finely divided particles of a silicate mineral pigment carrying on the surface thereof as a true coating at least one hydrous additive material in a substantially amorphous state, selected from the group consisting of a metal phosphate, phosphite, borate, borophosphate, borophosphite and chromate.

2. The pigment of Claim 1 in which the additive pigment material is selected from the group consisting of a calcium phosphate, a calcium phosphite, and a calcium borate.

3. The pigment of Claim 1 in which the silicate mineral pigment is selected from the group consisting of wollastonite, talc, mice, nepheline syenite, and feldspar.

4. The pigment of Claim 1 in which the metal is selected from the group consisting of calcium, magnesium, strontium, barium, lead and zinc.

5. The pigment of Claim 2 in which the calcium phosphate is dicalcium phosphate.

6. The pigment of Claim 2 in which the calcium phosphate is a basic calcium phosphate.

7. The pigment of Claim 2 in which the calcium borate is a basic calcium borate.

8. A composite pigment comprising finely divided particles of talc carrying on the surfaces thereof and in intimate association therewith a basic calcium phosphate.

9. A composite pigment comprising finely divided particles of talc carrying on the surfaces thereof and in intimate association therewith a calcium borate.

10. A composite pigment comprising finely divided particles of wollastonite carrying on the surfaces thereof and in intimate association therewith a basic calcium phosphate.

11. A composite pigment comprising finely divided particles of wollastonite carrying on the surfaces thereof and in intimate association therewith a calcium borate.

12. A pigment-containing coating composition containing as an essential pigment component the composite pigment of Claim 1.

13. A composite pigment comprising finely divided particles of mica carrying on the surfaces thereof and in intimate associatoin therewith a basic calcium phosphate.

14. A composite pigment comprising finely divided particles of mica carrying on the surfaces thereof and in intimate association therewith a calcium borate.

15. The pigment of Claim 1 in which the additive pigment material is formed in the presence of the silicate mineral pigment.

16. Method for the preparation of a composite pigment comprising the steps of:
    (a) forming in an aqueous medium a suspension of finely divided particles of an inert silicate mineral pigment base;
    (b) introducing into said suspension a basic compound of a metal selected from the group consisting of calcium, magnesium, strontium, barium, lead and zinc;
    (c) introducing an amount of at least one compound selected from the group consisting of phosphoric acid, phosphorous acid, and boric acid sufficient to convert said basic metal compound to a basic metal phosphate, basic metal phosphite, or basic metal borate or a mixture thereof in presence of said inert pigment base; and
    (d) subjecting the suspension of said inert pigment base and said metal phosphate, phosphite or borate to attrition for a period of two to four hours to produce an intimate association thereof with the particles of said inert pigment base and to form a composite pigment.

17. Method for the preparation of a composite pigment comprising the steps of:
    (a) forming in an aqueous medium a suspension of finely divided particles of an inert silicate mineral pigment base;
    (b) introducing into said suspension a basic calcium compound in an amount of 4% to 65% of the total weight of solids in the slurry;
    (c) introducing an amount of at least one compound selected from the group consisting of phosphoric acid, phosphorous acid and boric acid sufficient to convert said basic calcium compound to a basic calcium phosphate, basic calcium phosphite, or basic calcium borate or a mixture thereof in presence of said inert pigment base; and
    (d) subjecting the suspension of said inert pigment base and said calcium phosphate, calcium phosphite or calcium borate to attrition for a period of time sufficient to produce an intimate association of said calcium phosphate, phosphite, or borate with the particles of said inert pigment base and to form a composite pigment.

18. The method of Claim 16 in which the inert pigment base is selected from the group consisting of wollastonite, talc, mica, nepheline syenite and feldspar.

19. The method of Claim 16 in which the amount of metal compound employed in step (b) is effective to form from about 4% to about 65% by weight of metal phosphate, phosphite or borate in the composite pigment.

20. The method of Claim 17 in which the inert pigment base is selected from the group consisting of wollastonite, talc, mica, nepheline syenite and feldspar.

21. Method of preparing a coating composition comprising incorporating with conventional vehicle and other ingredients the composite pigment according to Claim 1, in an amount at least 50% of the total pigment volume present in said composition.

22. The pigment of Claim 1 in which the proportion of additive pigment material to inert base ranges from about 4% to about 65% by weight.

23. The pigment of Claim 1 in which the composite pigment exhibits a pH value greater than 7.

References Cited

UNITED STATES PATENTS

| | | | |
|---|---|---|---|
| 3,661,609 | 5/1972 | Kaufman | 106—291 |
| 3,725,100 | 4/1973 | Zentz | 106—72 |
| 3,276,892 | 10/1966 | Pitrot | 106—308 B |
| 3,380,836 | 4/1968 | Robinson | 106—306 |
| 3,004,857 | 10/1961 | Merson et al. | 106—308 B |
| 3,576,657 | 4/1971 | Cohn et al. | 106—306 |

FOREIGN PATENTS

| | | | |
|---|---|---|---|
| 641,608 | 8/1950 | Great Britain | 106—306 |

DELBERT E. GANTZ, Primary Examiner

J. V. HOWARD, Assistant Examiner

U.S. Cl. X.R.

106—288 B, 291, 306, 297, 309

UNITED STATES PATENT OFFICE
CERTIFICATE OF CORRECTION

Patent No. 3,846,148      Dated November 5, 1974

Inventor(s) John S. Nordyke and William C. Spangenberg

It is certified that error appears in the above-identified patent and that said Letters Patent are hereby corrected as shown below:

Column 7, line 71, "board" has been changed to broad.

Column 13, line 55, "mice " has been changed to mica.

Signed and sealed this 22nd day of April 1975.

(SEAL)
Attest:

RUTH C. MASON
Attesting Officer

C. MARSHALL DANN
Commissioner of Patents
and Trademarks

UNITED STATES PATENT AND TRADEMARK OFFICE
CERTIFICATE OF CORRECTION

PATENT NO. : 3,846,148
DATED : November 5, 1974
INVENTOR(S) : John S. Nordyke and William C. Spangenberg It is certified that error appears in the above—identified patent and that said Letters Patent are hereby corrected as shown below:

Column 5, line 46, "the monohydrate being the principal compound," has been deleted.

Signed and Sealed this

Eleventh Day of April 1978

[SEAL]

Attest:

RUTH C. MASON
*Attesting Officer*

LUTRELLE F. PARKER
*Acting Commissioner of Patents and Trademarks*